INVENTOR.
JOHN E. ANTONIDIS
BY
Willits, Hardman & Fehr
his ATTORNEYS

Sept. 6, 1955  J. E. ANTONIDIS  2,716,895
ENGINE STARTING APPARATUS
Filed Aug. 5, 1952  2 Sheets-Sheet 2

INVENTOR.
JOHN E. ANTONIDIS
BY
Willito, Hardman & Fehr
his ATTORNEYS

United States Patent Office 2,716,895
Patented Sept. 6, 1955

2,716,895

ENGINE STARTING APPARATUS

John E. Antonidis, Anderson, Ind., assignor to General Motors Corporation, Detroit, Mich., a corporation of Delaware Application August 5, 1952, Serial No. 302,647

7 Claims. (Cl. 74—7)

This invention relates to improvements in electrical engine starting apparatus of the type which includes a pinion connecting with the shaft of the starting motor and movable therealong into mesh with the engine flywheel gear. The pinion is shifted by a solenoid which operates also to close a switch to connect the starting motor with a current source.

An object of the present invention is to provide a solenoid-actuated switching device in which is incorporated novel features of design where the contacts and the terminals are at the drive end of the solenoid which achieves greater simplicity of structure to allow fabrication at a minimum of cost.

Another object of the invention is to provide a novel form of enclosure which will enclose and seal an electric switch mounted upon and operatively connected with a dynamoelectric machine and which will enclose the operative connection between the switch and the dynamoelectric machine. This object is accomplished by use of a one-piece resilient boot which engages the switch case and the dynamoelectric machine so that the operative connection between the switch and dynamoelectric machine is sealed to exclude dirt, moisture and other foreign matter and simultaneously sealing the switch mechanism.

Further objects and advantages of the present invention will be apparent from the following description, reference being had to the accompanying drawings wherein a preferred embodiment of the present invention is clearly shown.

Figures 1, 2:
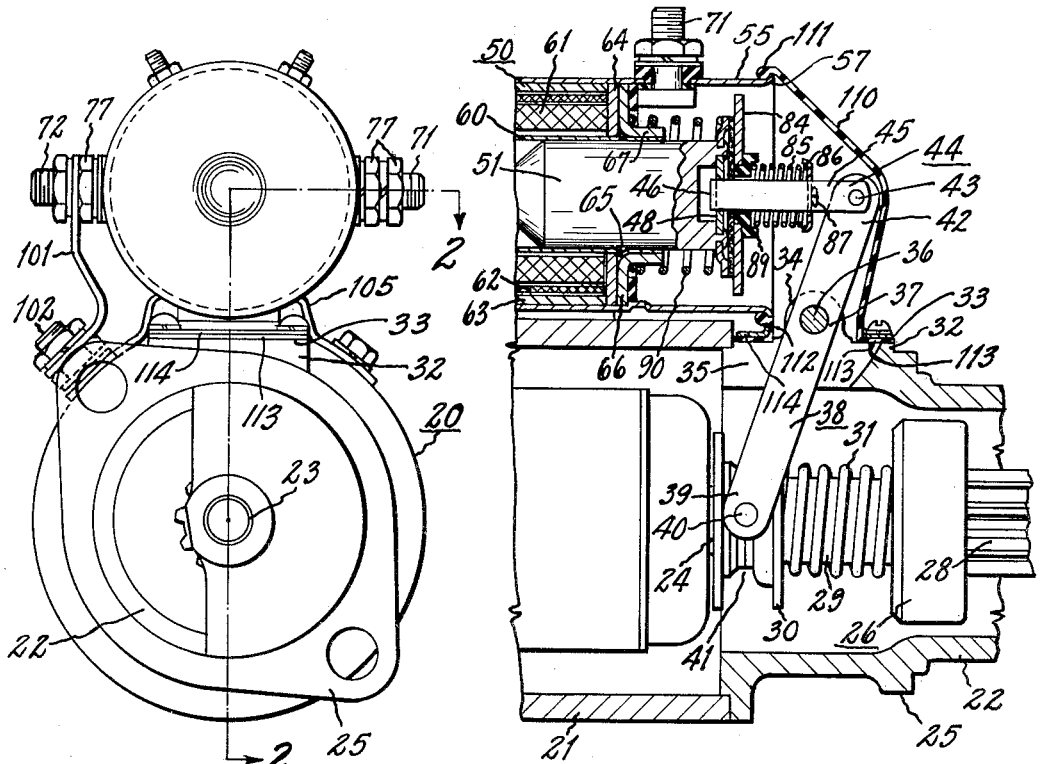
Fig. 1 is an end view of an engine starting apparatus embodying the present invention.
Fig. 2 is a fragmentary, partly in longitudinal section, of engine starting apparatus embodying the present invention and taken on line 2—2 of Fig. 1, and showing the solenoid switch in open position.

Referring to the drawings, 20 designates an electric motor including a field frame 21 to which is attached a pinion housing 22 provided with a bearing 23, see Fig. 2, for the right end of a splined shaft 24. The left end of the frame support and end member, not shown, which provides a bearing for the left end of the shaft 24. The housing 22 is provided with a flange 25 by which it may be attached to a flywheel housing of an engine in the usual manner. The shaft slidably supports a one-way or overrunning clutch 26 connected with a pinion 28 adapted to mesh with gear, not shown, but normally out of engagement therewith. Extending from the left side of the clutch 26 is a sleeve 29 which slidably supports a collar 30. A spring 31 is retained under compression between the collar 30 and the clutch 26. For further details of the starter drive, reference is made to Critchfield Patent No. 2,211,053.

Figure 7:
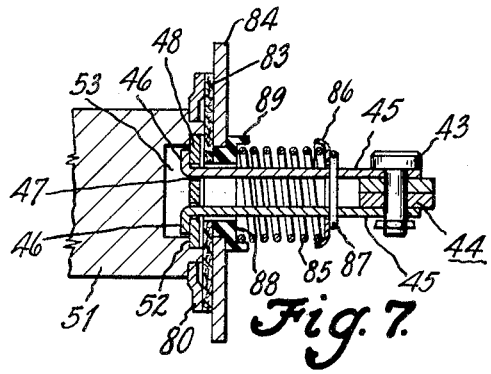
Fig. 7 is a sectional view taken on line 7—7 of Fig. 5.

The pinion housing 22 is formed with an outward extension 32 having a plane annular surface 33 on its upper face which has a pair of aperture lugs 34 attached thereto. These lugs are separated by a through slot 35. The apertured lugs 34 support a pivot pin or screw 36 for a hub 37 of a lever 38 made of two parts spot welded together. The lower end 39 of the lever is bifurcated to provide two arms, each carrying a stud 40 received by an annular groove 41 in the collar 30. The upper end 42 of the lever has an opening for receiving a pin 43 extending across the arms of a link 44. The link 44, shown in Fig. 7, includes two L-shaped members including a pair of arms 45. In this instance the arms 45 extend through slots 47 in a plate 48 with the ends 46 of the arms 45 engaging the inner face of the plate. The plate 48 is attached to an armature 51 of a solenoid unit 50.

The link 44, plate 48 and the armature 51 are united together by forcing the plate into a counterbored recess 52 of the armature after the link arms have been passed through the slots 47 of the plate 48. The recess 53 of the armature provides for a limited axial and swinging movement of the link 44 relative to the armature, the purpose of which will be described hereinafter.

Figures 3, 4:
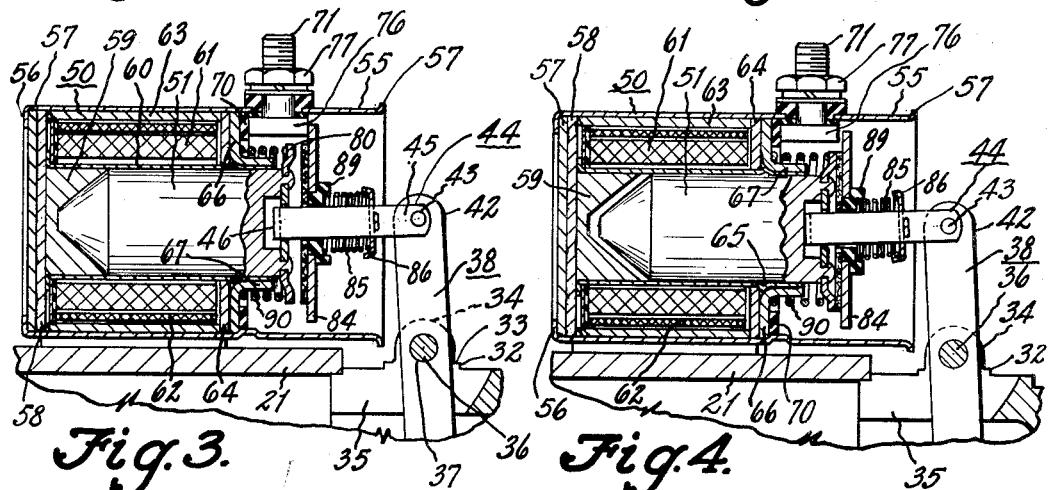
Fig. 3 is a sectional view of the solenoid switch showing the switch closed.
Fig. 4 is a view similar to Fig. 3, but showing the switch in open position which it will occupy in case the pinion of motor is engaged with the flywheel and the switch is opened.

The solenoid unit 50 includes a shell 55 having an inturned flange 56 at the left end of an outwardly extending flange 57 at the right end as viewed in Figs. 3 and 4. The left end of the shell is closed, this being accomplished by a sub-assembly including metal plates or discs 57 and 58, and a core 59. The plates 57, 58 and core 59 are united by projection welding. A coil unit is placed within the shell 55 which includes a tube 60 of non-magnetizable material which surrounds the core 59. The tube 60 is surrounded by a magnet coil 61 of relatively coarse wire surrounded by a magnet coil 62 of relatively fine wire which are surrounded by an inner shell 63 having its left end abutting plate 58 and having its right end abutting an apertured metal disc 64. The assembly of parts including the parts 57, 58, 59, 60, 61, 62, 63 and 64 are held together by an annular bead 65, formed on the tube 60 which bears against the disc 64. The coil unit is held within the shell by a plate or disc 66 having a flange 67, an insulating washer 70 and a pair of stationary contacts 71 and 72. The contacts 71 and 72 extend from the interior of the shell to the exterior through diametrically opposed apertures and are held in insulated relation with the shell by insulating washers as shown in Figs. 3 and 4. The contacts 71 and 72 have heads 76 provided with flat sides which bear against the washer 70 so as to prevent the contacts from turning. The contacts are held in assembled relation with the shell by nuts 77.

Figure 6:
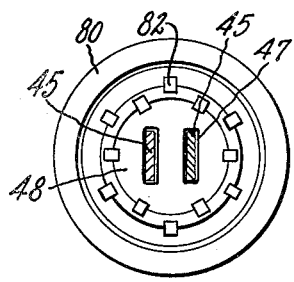
Fig. 6 is a view taken on line 6—6 of Fig. 5.

As mentioned heretofore the link 44 and the armature are united together. The armature 51 also carries a dish shaped washer 80. The armature is provided with an annular rib which is encircled by the washer 80 and the washer is secured to the armature by staking over the rim as at 82, see Fig. 6. Before the link 44 is attached to the upper end 42 of the lever 38, an insulating washer 83, a movable contact 84, an insulating bushing 89, a coiled spring 85, and a cup-shaped washer 86 are assembled on the link 44 and held in that assembled relation by a cotter pin 87. The spring 85 has one end bearing against a seat 88 formed in the insulating bushing 89 which insulates the contact 84 from link arms 45. The washer 83 insulates the contact 84 from the washer 80. The other end of the spring seats in the cup-shaped washer 86 and urges the washer against the cotter pin 87.

Before the armature is placed in the tube 55 a coiled spring 90 is placed around the flange 67 having one end bearing against the disc 66 and having the other end bearing against the washer 80. When the armature is inserted in the tube and the link 44 is attached to the upper end 42 of the lever 38 by the pin 43 the spring urges the armature to the right to urge the lever 38 in a clockwise direction. Counterclockwise direction of the lever 38 effects movement of the pinion toward the engine gear, not shown.

Figure 8:
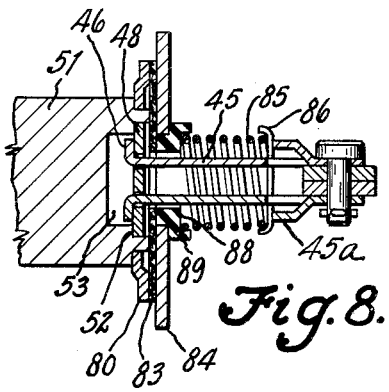
Fig. 8 is a sectional view similar to Fig. 7 with a modified link connection.

Referring to Fig. 8, a modification of a link 44 is shown. In this instance the arms 45 are provided with struck out lugs 45a which form stops for the cup-shaped washer 86.

Figure 5:
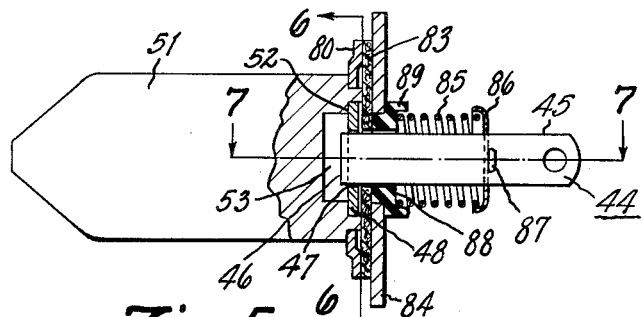
Fig. 5 is a view, partly in section, of sub-assembly including an armature, a movable contact and a link connection embodied in the present invention.
Figure 9:
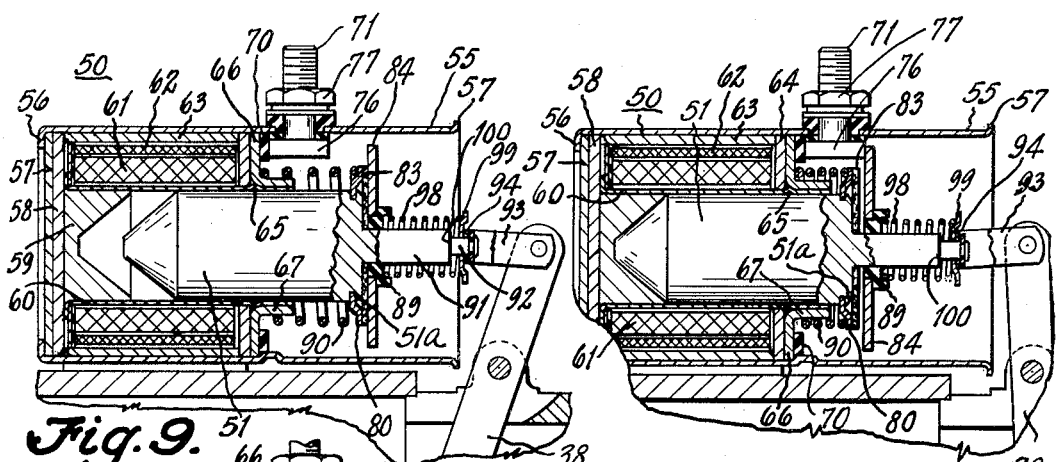
Fig. 9 is a sectional view of a solenoid switch showing a modified form of the armature and link connection.
Figure 10:
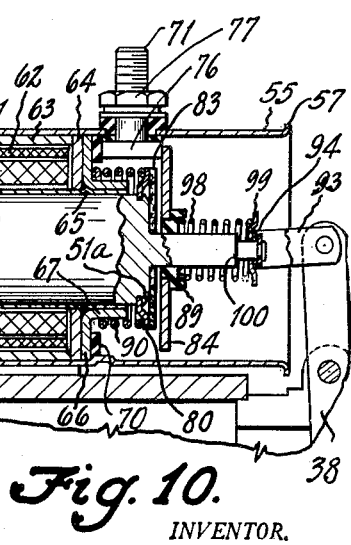
Fig. 10 is a sectional view of the solenoid switch in the closed position.
Figure 11:
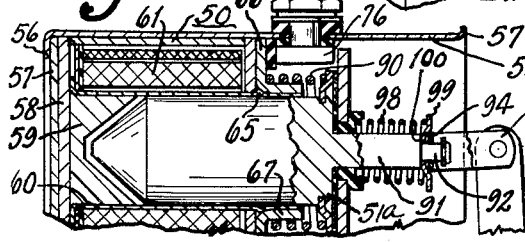
Fig. 11 is a sectional view showing the solenoid switch in an open position.

In place of the armature and link assembly shown in Fig. 5, a modified form of an armature and link assembly shown in Figs. 9 through 11 may be used. In this instance the washer 80 is secured to the armature 51 by staking over a portion of the armature on the washer as at 51a. The armature is preferably formed with an integral stud 91 having a reduced portion 92. A U-shaped link 93 is attached to the extension or reduced portion 91 by riveting the extension over the yoke 94 of the U-shaped link 93. Before the U-shaped link 93 is secured to the extension, an insulating washer 83, a movable contact 84 an insulating bushing 89 a coiled spring 98 and a washer 99 are assembled on the extension 91. The washer 99 is mounted on the reduced portion 92 to provide play or a lost motion connection between a shoulder 100 and the yoke 94 of link 93. Movable contact 84 is insulated from the armature at 51a by washer 83 and an insulating bushing 89. A counterbore of bushing 89 provides a seat for one end of the spring 98. The ends of the arms of link 93 are attached to the upper end of the lever 38 in a manner similar to that described for link 44. It is pointed out that the extension 91 and U-shaped member 93 form the linkage between the armature and the lever.

Referring to Fig. 1 the contact 71 is adapted to be connected with the non-grounded terminal of a battery and the contact 72 is adapted to be connected by a strap 101 with the insulated terminal 102 of the starting motor whose terminal is grounded.

The shell 55 is attached to the field frame 21 by a bracket 105 which has flanges curved to fit the field frame and the flanges provide suitable openings for attaching the bracket to the field frame so that in this instance the axis of the solenoid unit is parallel to the axis of the field frame 21.

For sealing off and enclosing the contacts 71, 72 and 84 and the pivoted connection for the lever 38 on the pinion housing 22, a one-piece sealing member or boot 110 of flexible material is provided. This boot has an annular portion 111 which fits snugly around shell 55 and has a cylindrical portion 112 provided with a flange 113 adapted to bear against the annular surface 33. The flange is clamped between a metal washer 114 and the plate surface. The washer and the flange are secured to the annular surface by bolts. The flexible boot for this purpose is disclosed in my copending application Serial No. 294,501, filed June 19, 1952.

Figure 12:
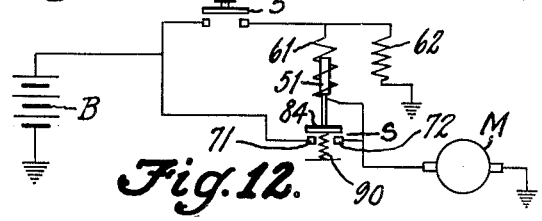
Fig. 12 is a diagrammatic view of the electrical circuit.

To start the engine, reference is made to the wiring diagram Fig. 12. The switch S is closed to connect both coils 61 and 62 with the battery B. Thus when the switch S is closed current will flow from the battery B through coils 61 and 62 of the electromagnet and the magnetic pull of both of these coils is operative to shift the armature to the left as viewed in Fig. 3. As the armature 51 moves to the left, Fig. 2, it will cause the link 44 to move the lever 38 counterclockwise to shift the pinion 28 to the right into mesh with the engine gear not shown. As the armature 51 moves to the left the contact 84 moves with it to bridge contacts 71 and 72 whereupon the starting motor M receives current from the battery B and the coil 61 is short circuited. The coil 62 is operative to maintain the armature 51 in its left-most position as shown in Fig. 3. The starting motor M cranks the engine to render it self-operative when the engine is self-operative, the switch S is released, the spring 90 moves the armature to the right which in turn moves the contact 84, link 44 to the right. The link moves the lever 38 clockwise and the starter drive to the left against a stop sleeve on the shaft thereby demeshing the pinion 28.

In case the ends of the pinion teeth abut the ends of the flywheel gear teeth, the solenoid armature 51 will compress the spring 31 and move the contact 84 into engagement with contacts 71—72. The motor turns the pinion 28 into meshing registration with the gear of the flywheel whereupon the spring 31 is released quickly to move the pinion 28 into driving engagement with the flywheel gear.

As set forth heretofore the armature 51 has a recess 52 to provide limiting swinging movement of the link 44 relative to the armature, and also to provide a lost motion connection which permits the separation of contact 84 from contacts 71 and 72 upon opening of switch S. The lost motion between the armature and the link 44 permits movement of the armature relative to the lever in case the engine fails to start or the battery fails to turn the engine crankshaft. When this takes place, the friction is so great between the pinion and flywheel teeth because the torque of the starting motor and the spring 90 is not sufficient to disengage the pinion from engine gear upon opening of the switch S. The lost motion connection between the armature 51 and link 44 permits the heavy spring 90 to separate the contact 84 from contacts 71, 72 against the force of the weaker spring 85 upon opening of the switch S. The spring 90 will be unable to move the pinion 28 out of mesh with the engine gear due to friction between these parts which could happen in case the motor M is unable to rotate the engine gear after the pinion is fully meshed therewith. The separation of the contact 84 from contacts 71, 72, causes the torque of the motor to cease, and the friction between the pinion and the engine gear disappears. When that happens the spring 90 operates to return the lever 38 and associated parts to their normal position.

While the embodiment of the present invention as herein disclosed, constitutes a preferred form, it is to be understood that other forms might be adopted.

What is claimed is as follows:

1. In an engine starting apparatus for internal combustion engines the combination comprising, an electric motor; a housing; driving means within the housing for engagement with the engine; a lever pivotally supported on the housing for shifting the driving means into engagement with the engine; a solenoid starting motor switch adapted to be mounted directly on the housing, said switch including a shell open at one end only; a solenoid coil supported within the shell; open at one end only; a solenoid coil supported within the shell; an armature within the coil; a pair of stationary contacts insulatingly supported on the shell adjacent the open end thereof; a link connected with the armature and the lever; a biased movable contact under the control of the armature and adapted to close a circuit between the contacts when the armature is moved by the coil; and resilient means to oppose movement of the armature and to bias the movable contact to an open position, whereby when said contacts are in closed position the driving means is in operative engagement with the engine.

2. In an engine starting apparatus for internal combustion engines the combination comprising, an electric motor; a housing; driving means within the housing for engagement with the engine; a lever pivotally supported in an opening in said housing; for shifting the driving means into engagement with the engine; a solenoid starting motor switch adapted to be mounted directly on the housing, said switch including a shell open at one end only; a solenoid coil supported within the shell; an armature within the coil; a pair of stationary contacts insulatingly supported on the shell adjacent the open end thereof; a link connected with the armature and the lever; a biased movable contact under the control of the armature and adapted to close a circuit between the contacts when the armature is moved by the coil; and resilient means to oppose movement of the armature and to bias the movable contact to an open position, whereby when said contacts are in closed position the driving means is in operative engagement with the engine; and a unitary structure for sealingly closing the opening in the housing and the open end of said shell.

3. An engine starting apparatus comprising an electric motor including a housing supporting a shaft; a pinion connected with the shaft and adapted to be moved axially into mesh with a gear of an engine to be started; a pivotally supported lever for transmitting motion to the pinion; a switch for connecting the motor with a current source; means for actuating the lever and closing the switch, said means comprising a shell open at one end only; solenoid coils supported within the shell; a pair of stationary contacts insulatingly supported adjacent the open end of the shell; an armature in the shell adapted to be moved by the solenoid coils; a link for connecting the armature with the lever, said link having a lost motion connection with the armature; a biased movable contact insulatingly supported from and slidable on the link adapted to bridge the stationary contacts; and a spring opposing the movement of the armature and to bias the movable contact to an open position.

4. An engine starting apparatus comprising, an electric motor including a housing supporting a shaft; a pinion connected with the shaft and adapted to be moved axially into mesh with a gear of an engine to be started; a pivotally supported lever for transmitting motion to the pinion; a switch for connecting the motor with a current source; means for actuating the lever and closing the switch, said means comprising a shell open at one end only; outwardly projecting flange means on the open end of the shell; a solenoid coil adapted to be fitted in the shell; a pair of insulated contacts positioned in spaced relation in the enclosure and adapted to extend radially outwardly through apertures adjacent the flange of the enclosure; an armature in the enclosure adapted to be moved by the solenoid coil; a link connected with the armature and the lever; a biased movable contact slidable on the link and adapted to close a circuit between the contacts when the armature is moved by the solenoid coil; a spring opposing the movement of the armature and to hold the movable contact separated from the stationary contacts when the coil is deenergized; and a preformed flexible rubber member for enclosing a portion of the lever exterior to the housing and the link exterior the shell, said member having a tubular portion connected with a housing and having an annular portion connected with the shell, said flange preventing accidental removal of the annular portion from the shell.

5. In an engine starting apparatus, the combination comprising; an electric motor having a shaft and a pinion axially movable on said shaft, means for axially moving said pinion, a second means for actuating said first means, said second means including; a solenoid having a movable armature, a pair of stationary contacts carried by said solenoid, a link connecting said armature and said second means and having a lost motion connection therewith, a movable contact supported by and slidable on said link and spring biased in one direction and adapted to bridge said stationary contacts for connecting said electric motor with a source of current and a spring adapted to oppose the movement of said armature and to oppose the bias on said contact for moving the movable contact to an open position with respect to said stationary contacts when said link is moved through its lost motion connection relative to said armature.

6. In an engine starting apparatus, the combination comprising; an electric motor having a shaft and a pinion axially movable on said shaft, means for axially moving said pinion, a second means for actuating said first means, said second means including; a solenoid having a movable armature, a pair of stationary contacts, a link having a lost motion connection with said armature and connected with said second means, a movable contact supported by and slidable on said link and biased to a predetermined position by a pair of opposed springs and adapted to bridge said stationary contacts for connecting said electric motor with a source of current when the armature is moved in one direction by the solenoid, one of said springs being adapted to oppose the one direction movement of said armature and the other of said springs being adapted to oppose the lost motion movement of said link relative to said armature whereby the connection between said contacts is broken when said armature is moved by said one spring against the bias of said other spring.

7. An electrical apparatus used in starting internal combustion engines wherein the electrical motor is adapted to intermittently engage with a portion of the engine for starting same, the combination comprising; a starting motor; a solenoid mounted on said motor; a switch including fixed and movable contacts, said movable contact being adapted to be actuated by said solenoid for energizing the motor; connecting means driven by the motor and adapted to engage said portion of the engine for starting the same; a lever for engaging the connecting means with the engine; a solenoid armature adapted to be moved by the solenoid; a single actuator adapted to be moved by the solenoid armature and having a lost motion connection therewith and slidably carrying the movable switch contact thereon and connected to said lever, whereby said solenoid when energized moves the contacts into engagement with one another and the connecting means is moved by said lever into engagement with said portion of the engine.

References Cited in the file of this patent

UNITED STATES PATENTS

| | | |
|---|---|---|
| 2,578,094 | Sears | Dec. 11, 1951 |
| 2,611,274 | Thorpe | Sept. 23, 1952 |